United States Patent

Yozo

[15] 3,689,137
[45] Sept. 5, 1972

[54] FILM REWIND DEVICE FOR COMPACT CINECAMERAS

[72] Inventor: Iida Yozo, Tokyo, Japan

[73] Assignee: Nippon Kogaku K.K., Tokyo, Japan

[22] Filed: Nov. 23, 1970

[21] Appl. No.: 91,997

[30] Foreign Application Priority Data

Nov. 28, 1969 Japan..................44/95167

[52] U.S. Cl. ......................352/91, 352/172, 352/217
[51] Int. Cl. ...........................................G03b 21/36
[58] Field of Search................352/91, 217, 156, 172

[56] References Cited

UNITED STATES PATENTS

| 3,582,198 | 6/1971 | Reinsch | 352/91 |
| 3,549,249 | 12/1970 | Katsuyama | 352/91 |
| 3,545,852 | 12/1970 | Winkler et al. | 352/91 |

Primary Examiner—Samuel S. Matthews
Assistant Examiner—Russell E. Adams, Jr.
Attorney—Ward, McElhannon, Brooks & Fitzpatrick

[57] ABSTRACT

A film rewind device for compact cinecameras of the type using a film cartridge having no supply spool shaft operable from the exterior thereof but provided with detent means attached to a take-up core, and in which the length of film to be loosely supplied to the take-up chamber of the cartridge can be varied in proportion to the film roll diameter in the supply chamber of the cartridge by the utmost utilization of the fact that the space in each of the supply and take-up chambers varies in proportion to the length of film photographed, and the length of film to be loosely supplied into the take-up chamber can be selected as desired within a predetermined range and that length of film can be rewound exactly.

6 Claims, 9 Drawing Figures

FILM REWIND DEVICE FOR COMPACT CINECAMERAS

BACKGROUND OF THE INVENTION

1. Field of the Invention

This invention relates to compact cinecameras, and more particularly to a film rewind device for such cameras.

2. Description of the Prior Art

Some of the film cartridges used with cinecameras are provided with detent means disposed in the take-up chamber thereof for preventing slackening of the fed film in the cartridge. In a cinecamera using a film cartridge of such type, the double-exposure technique is adapted and in this connection the film rewind operation is effected by temporally stopping the take-up of the film so as to store a predetermined length of the fed film in the space within the cartridge and thereafter rewinding that length of film. Such a system can not always ensure an available or sufficient space within the cartridge for that purpose. More specifically, during the initial stage of photographing, space is abundant in the take-up chamber into which the film is supplied loosely with the take-up core being temporally stopped, whereas space is approximately null in the supply chamber into which the loosely supplied film is to be rewound. During the intermediate stage of photographing, the spaces in the supply and take-up chambers become substantially equal to each other and the length of film to be supplied or the length of film to be rewound becomes greatest at this stage. At the final stage of photographing, the take-up chamber is full of film and no space is available therein.

Attempts have heretofore been made to solve this problem by presetting an unrewindable range for several feet of the film in each of the leading and trailing end portions thereof and a rewindable range for the intermediate portion of the film. As a result, the length of film to be rewound has been limited to a predetermined value. An attempt to increase such limited length of film to be rewound has entailed a decrease in the rewindable range, and an attempt to increase the rewindable range has entailed a decrease in the length of film to be rewound.

SUMMARY OF THE INVENTION

It is the object of the present invention to overcome the above-described disadvantages existing in the prior art and provide a film rewind device for cinecameras in which the length of film to be loosely supplied to the take-up chamber of a film cartridge can be varied in proportion to the film roll diameter in the supply chamber of the cartridge by the utmost utilization of the fact that the space in each of the supply and take-up chambers varies in proportion to the length of film photographed. Moreover, in the film rewind device of the present invention, the length of film to be loosely supplied into the take-up chamber can be selected as desired within the possible range determined according to the exposed film as mentioned, and the exact length of film thus loosely supplied can be rewound from the take-up chamber to the supply chamber of the film cartridge.

According to the present invention, in a compact cinecamera using a film cartridge, on a take-up core of which is provided with detent means, while there is provided no shaft for a film supply spool, the cinecamera including shutter shaft associated at least with drive means for driving shutter means, film supply means and film measuring means. An automatic stop means for automatically stopping normal and reverse rotations of the shutter shaft and provided on the shutter shaft or on an intermediate shaft associated therewith, the improvement comprises: a displace means associated with the film measuring means to be displaced in such manner that the amount of displacement is zero at the extremities of an indicator scale on the measuring means and that the amount of displacement is greatest in the middle of the indicator scale; first control means associated with the displace means and displaceable in response to the displacement of the displace means during normal photographing operation for determining the time for the automatic stop means to automatically stop the normal rotation of the shutter shaft to thereby control the amount of the film to be photographed with the film being loosely fed; and second control means displaceable within the amount of displacement of the first control means when the device has been changed over from the normal photographing position to another photographing position for taking continuous shot with the film being loosely fed, the displacement of the second control means determining the time for the automatic stop means to stop the reverse rotation of the shutter shaft to thereby control the amount of film to be rewound.

The above and other features of the present invention will become fully apparent from the following detailed description taken in conjunction with the accompanying drawings.

DESCRIPTION OF THE PREFERRED EMBODIMENTS

Figure 1:
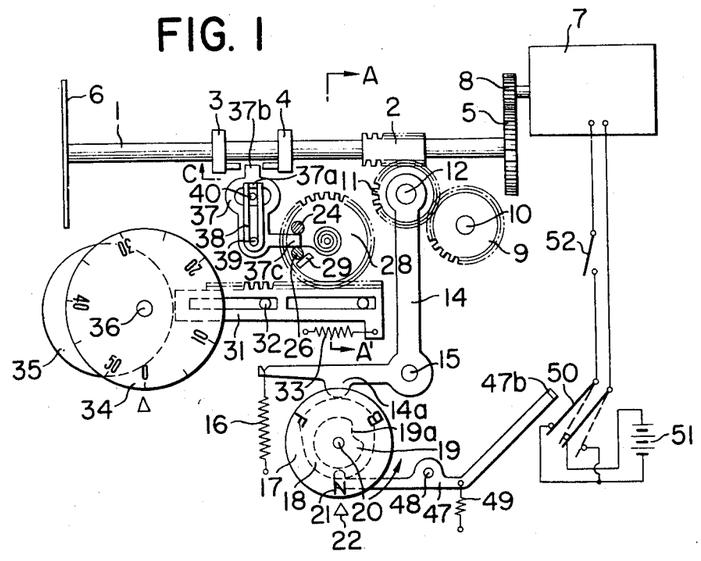
FIG. 1 is a plan view schematically showing the essential parts of the film rewind device embodying the present invention as the device has been set in a position for starting normal photographing.
Figure 5:
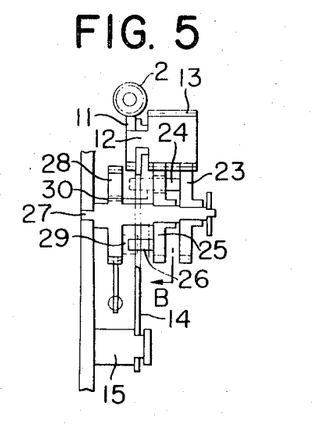
FIG. 5 is a cross-sectional view taken along lines V—V of FIG. 1.

Referring to FIG. 1, a shutter shaft 1 operatively associated with a conventional shutter means (not shown) and with a film feeding pawl 53 (FIG. 9) movable in opposite directions is securely provided with a pin 1', a worm 2, a pair of pawled stop discs 3 and 4, a shutter gear 5 and a shutter 6, these being positioned at suitable distances as hereinafter explained. A micromotor 7 has an output shaft connected to the shutter shaft 1 at one end thereof via pinion 8 and shutter gear 5. The micromotor 7 is a reversible motor energized through a change-over switch 50 for changing the rotational direction of the motor to be described and thereby the shutter shaft 1 is driven to rotate in normal or reverse direction. A film take-up gear 9 is engaged with a take-up shaft 56 (FIG. 9) (The manner of this engagement is not shown) which is enclosed in a conventional film cartridge having no rewind spool shaft but provided with detent means for preventing the film slack. The film take-up gear 9 is mounted on a shaft 10 journalled to the body of a camera and is engageable with a clutch gear 11 formed of a thin spur gear and serving also as a worm wheel, so that the gear 9 is driven to rotate by the clutch gear 11. As shown in FIG. 5, the clutch gear 11 is rotatably mounted on a shaft 12 together with an integral gear 13 in such a manner that an inverted L-shaped clutch lever 14 is sandwiched at the upper end thereof between the clutch gear 11 and the integral gear 13. The clutch gear 11 is in engagement with the worm 2 seated on the shutter shaft 1. The clutch lever 14 is pivotally mounted on a pin 15 secured to the camera body and is biased by a compression spring 16 so that a projection 14a formed in one arm of the clutch lever 14 is urged into contact with a clutch cam 18. The clutch cam 18 is mounted rotatably on a shaft 20 which is manually operated by a knob 17 formed integrally therewith. The operating knob 17 has integrally switch cam 19 which will be described later in detail. The operating knob 17 is provided with marking 21 including letters B, F and N formed at predetermined positions therein, which marking cooperates with an index 22 formed in the camera body. The clutch cam 18 is designed to selectively displace the clutch lever 14 so that the take-up gear 9 is engaged with the clutch gear 11 when the letter N of the marking 21 is registered with the index 22 and that the gear 13 (FIG. 5) is engaged with counter gears 23 and 25 to be described when the letter F or B of the marking 21 is registered with the index 22.

Figure 4:
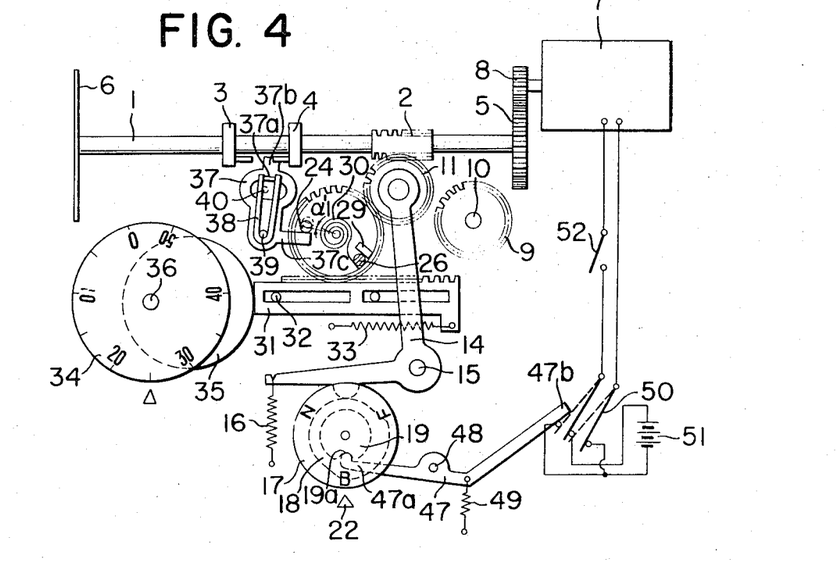
FIG. 4 is a plan view also similar to FIG. 1 but showing the device as it is rewound from the position of FIG. 3.
Figure 6:
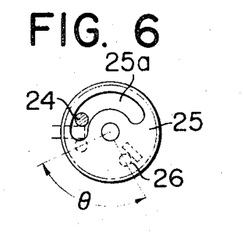
FIG. 6 is a partly sectional view taken along line VI of FIG. 5.

In FIG. 5, the counter gears 23 and 25 are rotatably mounted on a common shaft 27 which is rotatably journalled to the camera body and integral with a detector gear 28 having a projection 29 for engaging a rack 31 to vary the amount of film to be rewound. The counter gear 23 has a pin 24 studded therein and extending through an elongated actuate slot 25a formed in the counter gear 25, as shown in FIG. 6. The pin 24 is adapted to actuate a stop pawl 37, which will be described later, when the knob 17 is rotated until the mark B thereon is registered with the index 22 as shown in FIG. 4. The counter gear 25 is further formed with a pin 26 radially opposite side to the slot 25a. The pin 26 is urged into contact with the projection 29 formed axially on a detector gear 28 to be described when the counter gear 25 is disengaged from the gear 13 integral with the clutch gear 11.

The counter gear 25 and its pin 26 together constitute first control means, and the counter gear 23 and its pin 24 together constitute second control means.

The rack 31 always engaged with the detector gear 28 receives guide pins 32 in the guide slots formed therein and is biased by a tension spring 33 into engagement with a cam 35 which is rotated by the shutter shaft 1 through an unshown interlocking member connecting operative to a shaft 36 of a film measuring disc 34. The cam 35 is so arranged that the cam movement caused thereby may be transmitted to the projection 29 of the detector 28 via the rack 31 so as to enable the film to be taken-up or rewound in accordance with the length thereof to be photographed, and that the amount of displacement of the cam 35 may be zero at the extremities of the scale graduated on the film measuring disc 34, but maximum in the middle of the scale.

The detector gear 28, projection 29, shaft 27, rack 31, guide pins 32, spring 33 and cam 35 together constitute displace means.

A stop member 37 having a projection 37a vertically formed thereon and a longitudinally projected top end 37b is pivotally mounted on the camera body by means of a pin 39. A U-shaped spring 38 is secured to the shaft 39 and a pin 40 studded in the camera body in such a manner that the upper ends of the U-shaped spring 38 resiliently holds therebetween the projection 37a of the stop member 37. Thus, the stop member 37 is resiliently held by the U-shaped spring 38 so that the projected top end 37b is disposed between the pawl stops of the discs 3 and 4. The stop member 37 further includes a lower lateral projection 37c corresponding to the pins 24 and 26 studded in the counter gears 23 and 25.

Figure 7:
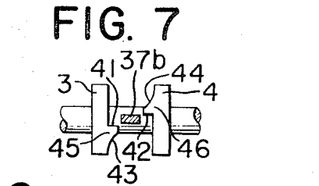
FIG. 7 is a partly sectional view taken along line VII of FIG. 1.

Referring now to FIG. 7, the pawled stop discs 3 and 4 are shown in detail. These stop discs 3 and 4 and formed with shoulders 41 and 42 and slant cam surfaces 43 and 44, respectively. The shoulder 41 and cam surface 43 of the stop disc 3 together form an axial pawl member 45, and the shoulder 42 and cam surface 44 of the other disc 4 together form an axial pawl member 46. The shoulders 41 and 42 are slightly spaced with respect to the projected top end 37b of the stop member 37 so as not to interfere therewith. The shoulders 41 and 42 are set in such an angular relation that the position in which they are brought into abutment with the projected top end 37b of the stop member 37 when they are stopped out of a possible take-up or rewind range or automatically stopped in accordance with a length of film photographed during a first shot, as described later, is the same as the position in which they are stopped by an unshown pawl for stopping the shutter shaft.

The switch cam 19 integral with the operating knob 17 has a recess 19a for receiving the left end projection 47a of a switch lever 47 when the mark B of the knob 17 is registered with the index 22. The switch lever 47 is pivotally mounted on a shaft 48 secured to the camera body and is biased by a tension spring 49 so that the projection 47a thereof is normally urged into contact with the switch cam 19, and that when the left end 47a is received in the recess 19a the right end 47b actuates a change-over switch 50 into a position for establishing a reverse drive circuit.

A power supply battery 51 and a switch 52 associated with the micromotor 7 and unshown shutter button constitute a change-over circuit for driving the shutter shaft 1 to rotate in normal and reverse directions.

Figure 9:
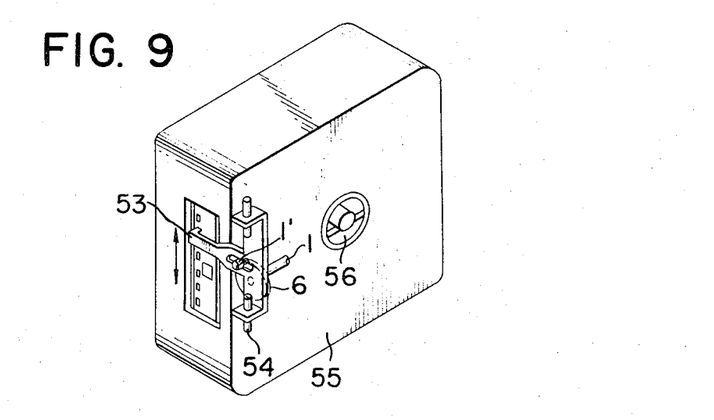
FIG. 9 is a perspective view for illustrating the relationship between the film cartridge and the film feeding means.

As shown in FIG. 9, film supply pawl means 53 is provided slidably on the shafts 54 and formed with a slot to receive the eccentric pin 1' integrally adapted to the disc 6 eccentrically with the center thereof, thus the film being moved in normal or reverse directions. Film cartridge 55 of the known type encloses therein a take-up core 56 provided with means for preventing the film slack.

Figure 2:
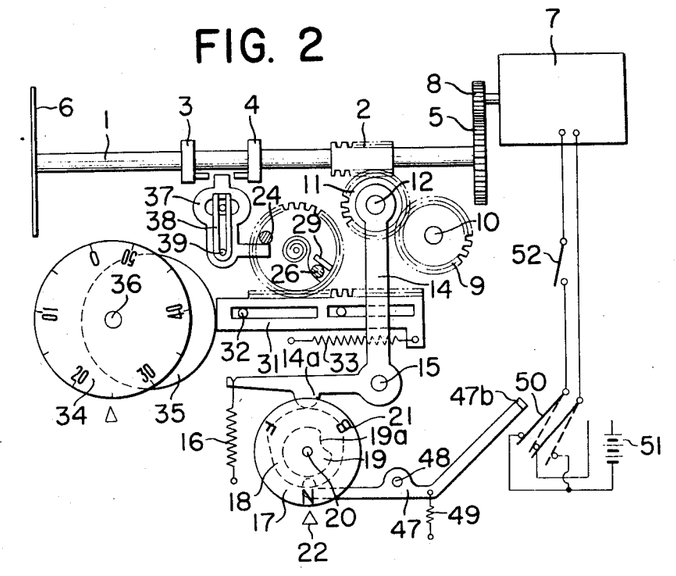
FIG. 2. is a plan view similar to FIG. 1 but showing the device as it is in a position where photographing is progressed to a certain degree.
Figure 3:
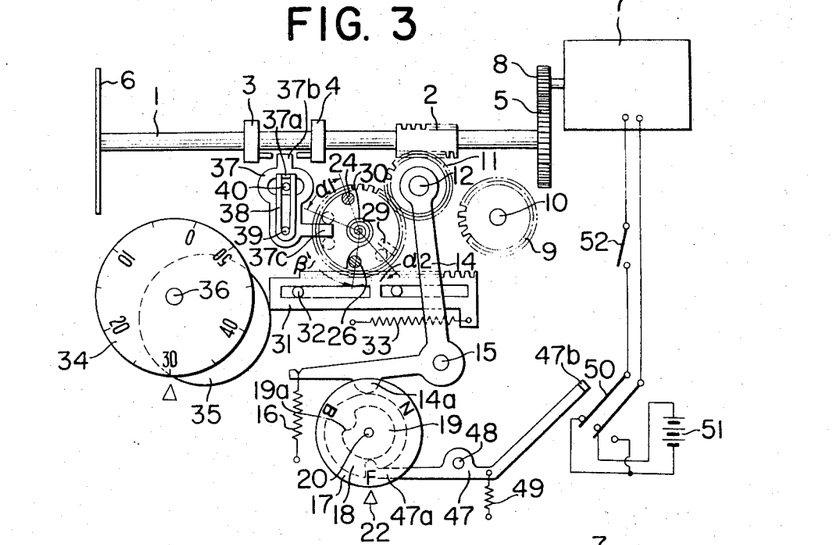
FIG. 3 is a plan view again similar to FIG. 1 but showing the device as it is changed over form the position of FIG. 2 to a position for effecting continuous shot while loosely supplying a film into the take-up chamber by temporally stopping the film take-up operation.

In operation, the operating knob 17 is manually rotated until the mark N thereof is registered with the index 22 as shown in FIGS. 1 or 2. The shutter button (not shown) is operated to close the switch 52, whereby a normal drive circuit is established and the micromotor, 7 is thereby rotated in normal direction. Thus, the shutter shaft 1 is also driven to rotate in normal direction by the micromotor 7 via pinion 8 and shutter gear 5, so that the feeding pawl 53 associated with the shutter shaft 1 feeds the film in normal direction. At the same time, the take-up gear 9 is driven through worm 2 and clutch gear 11 so that the film is taken up by the take-up shaft 56 adapted within the film cartridge. Thus, normal shot may be effected. Concurrently therewith, the film measuring disc 34 is driven to rotate by the shutter shaft 1 via unshown interlocking member to thereby indicate the length of film photographed, and the cam 35 integral with the film measuring disc 34 is also rotated to displace the rack 31, whose displacement is converted through the projection 29 of the detector gear 28 into a possible take-up or rewind range as indicated by $\theta$ (FIG. 6) corresponding to the length of film photographed (FIG. 2). Subsequently the operating knob 17 is further rotated without interrupting the described shutter operation until the mark F of the knob 17 is registered with the index 22, whereby the clutch lever 14 is rotated counter-clockwise by the clutch cam 18 to disengage the clutch gear 11 from the take-up gear 9 and the gear 13 integral with the clutch gear 11 is engaged with the counter gears 23 and 25 (FIG. 3). In this position, the change-over switch 50 remains closed to maintain the normal drive circuit so as to allow the photographing operation to continue, and the rotation of the shutter shaft 1 causes the rotation of the counter gears 23 and 25 instead of the take-up gear 9, so that the pins 24 and 26 of the respective counter gears 23 and 25 move away from their respective associated projections 37c and 29, i.e., in the direction for increasing the values $\alpha_1$ and $\alpha_2$ in FIG. 3. Thus, the rotation of the take-up gear 9 is stopped and hence the film transported in normal direction by the film feeding pawl (FIG. 9) is loosely stored in the film cartridge without being taken up by the take-up shaft 56 therein. The length of film thus stored in the film cartridge corresponds to an angle which is within the possible take-up or rewind range $\theta$ shown in FIG. 6. When the shutter is released at a desired angular point $\alpha_2$ within the possible range $\theta$, the shutter shaft 1 and therefore the pawled stop discs 3, 4 are stopped at a predetermined position by unshown shutter stop member while leaving an available range $\beta$, and thus the film transportation is also stopped. On the other hand the pin 24 is spaced apart from the projection 37c by an angular distance corresponding to $\alpha_2$, i.e., $\alpha_1$.

When it is desired to release the shutter at the maximum possible take-up or rewind range, that is to say, when it is desired to take the angle $\alpha_2$ as large as possible within the possible range $\theta$, the shutter release operation may be continued until the studded pin 26 of the counter gear 25 strikes the projections 37c of the stop member 37 as to displace the projected top end 37b of the stop member 37 toward the pawled stop disc 3 against the action of the U-shaped spring 38. Thus, the shoulder 41 of the pawled stop disc 3 (FIG. 7) interferes with the top end 37b of the stop member 37, whereby the rotation of the shutter shaft 1 is automatically stopped and the film transportation is also stopped. At the same time, the pin 24 studded in the counter gear 23 is displaced by the same amount.

Subsequently, light entering through a photographing lens (not shown) is interrupted in the known manner, whereafter the operating knob 17 is rotated until mark B thereon is registered with the index 22 as shown in FIG. 4. Thus, the clutch lever 14 is stopped at its counter-clockwise rotated position by the clutch cam 18, and the gear 13 integral with the clutch gear 11 maintains its engagement with the counter gears 23 and 25, whereby the change-over switch 50 is changed over to establish a reverse drive circuit by the switch cam 19 via switch lever 47. In this position, if the shutter button is released, the micromotor 7 will be revolved in reverse direction and accordingly all the parts associated therewith will also be driven in reverse direction, whereby the amount of film loosely stored in the take-up chamber in the film cartridge may be reversely transported to return to the supply chamber. Simultaneously therewith, the counter gears 23 and 25 are also rotated in reverse direction so that the pin 24 of the counter gear 23 urges the projection 37c of the stop member 37 downwardly to thereby displace the top end 37b of the stop member 37 toward the pawled stop disc 4 against the action of the U-shaped spring 38. Thus, the shoulder 42 of the pawl member 46 in the stop disc 4 interferes with the top end 37b of the stop member 37, whereby the reverse rotation of the shutter shaft 1 and accordingly the reverse movement of the film are stopped automatically.

In FIG. 4, $\alpha'_1$ represents the angle over which the pin 24 of the counter gear 23 is rotated from the time when the top end 37b of the stop member 37 is interfered with the shoulder 42 of the stop disc 4 till the reverse rotation is automatically stopped. Such angle of rotation $\alpha'_1$ can be approximate to zero by suitably increasing the dimensional ratio of the top end 37b to the lower lateral projection 37c of the stop member 37.

Subsequently, when the operating knob 17 is again rotated until the mark N is registered with the index 22, the switch lever 47 is rotated counter-clockwise by the switch cam 19 against the action of the spring 49 while the clutch lever 14 is rotated clockwise by the clutch cam 18 against the action of the spring 16, to thereby bring the device into the position ready for effecting normal shot. Thus, the change-over switch 50 is returned to the normal drive position and the gear 13 is disengaged from the counter gears 23 and 25, while the clutch gear 11 is engaged with the take-up gear 9. Thus, the counter gears 23 and 25 are returned to their predetermined positions with the aid of pins 24 and 26, U-shaped spring 38, spiral spring 30, and pawls 45 and 46. At the same time, the stop member 37 is returned by the urge of the U-shaped spring 38 to its normal position where the stop member 37 is not interfered with by any of the pawls 45 and 46 of the stop discs 3 and 4. If the shutter button is actuated in this state, there will be accomplished a double shot.

Figure 8:
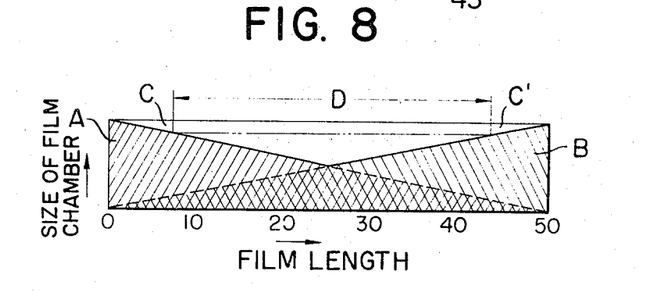
FIG. 8 is a graphical representation for illustrating the relationship between the film roll diameter and the space in each of supply and take-up chambers in a film cartridge used with the present invention.

Referring to FIG. 8, relations between the dimensions of the film chambers and the length of the film therein are graphically shown with the film roll diameters and the spaces in the supply and take-up chambers in the film magazine overlapping each other. The upper triangle defined by the leftwardly downward diagonal represents the space in the take-up chamber, and the upper triangle defined by the rightwardly downward diagonal represents the space in the supply chamber. The triangle A shown with hatching designates the film roll diameter in the supply chamber, and the other triangle B shown with hatching represents the film roll diameter in the supply chamber. C—C' represents the range over which the film can be loosely fed and rewound. As seen, such range is gradually increased from the initial stage of photographing and reaches a peak in the middle stage, whereafter it is gradually decreased toward the termination of photographing. Letter D represents the possible film take-up or rewind range according to the prior art.

It will thus be noted that according to the present invention, the fact that the space in each of the supply and take-up chambers of the film cartridge varies in proportion to the length of film photographed is utilized to the utmost so that the length of film to be loosely fed into the take-up chamber of the film cartridge can be varied in proportion to the length of film photographed. Moreover, the length of film to be loosely fed can be selected as desired within a predetermined range, and the exact length of film thus loosely fed into the take-up chamber can be rewound into the supply chamber. What is claimed is:

1. In a cinecamera of the type using a film cartridge equipped with anti-reversing means attached to a shaft for taking up the film, and including
    a driving shaft, shutter means operable by said driving shaft;
    driving means for normally and reversely rotating the driving shaft;
    means for transporting the film, associated with said driving shaft; and
    means for preventing the rotation of the take-up shaft while said film transporting means is operated to loosely feed the film into a take-up chamber in the film cartridge and loosely rewind the loosely fed film into a supply chamber said cartridge;
    the improvement comprising
    means for automatically stopping the normal and the reverse rotation of the driving shaft;
    means for determining the maximum amount of the film which is loosely fed into the take-up chamber and then rewound into said supply chamber;
    said determining means being associated with the driving shaft to vary said maximum amount in accordance with the amount of film wound on the take-up shaft;
    first means for operating the automatic stopping means to stop the normal rotation of the driving shaft when the film is loosely fed by the maximum amount into the take-up chamber; and
    second means for operating said automatic stopping means to stop the reverse rotation of the driving shaft when the film is loosely rewound into the supply chamber by the same length as that of the film loosely fed into the take-up chamber.

2. A cinecamera as defined in claim 1, wherein said determining means comprises
    a cam member movable in association with the driving shaft;
    a rack member biased to contact with the cam member and movable between a first position and a second position;
    said cam member displacing the rack member from the first position to the second position thereof while the film is wound on the take-up shaft from the first extremity to the middle thereof and displacing the rack member from the second position to the first position while the film is wound on the take-up shaft from the middle to the last extremity thereof; and
    a detector gear meshed with the rack member and provided with an integral gear and a protrusion thereon.

3. A cinecamera as defined in claim 1, wherein said automatic stopping means comprises a pair of discs securely mounted on said driving shaft and a stop member cooperable with said stop discs,
    said stop member being movable among a neutral position, a first position in which one of said discs is engaged therewith to stop the normal rotation of said driving shaft and a second position in which the other disc is engaged therewith to stop the reverse rotation of said driving shaft, said stop member being biassed to the neutral position thereof.

4. A cinecamera as defined in claim 3, wherein said first operation means comprises
    a first counter gear rotatably mounted on said integral shaft of the detector gear;
    said first counter bear being associated with the driving shaft when said film transporting means is operated to loosely feed the film into the take-up chamber and loosely rewind the loosely fed film into the supply chamber,
    and a pin provided on the first counter gear; said first counter gear being biassed for said pin to engage said protrusion of the detector gear and positioned for said pin to engage said stop member which is in the neutral position thereof when said rack member is in the first position thereof,
    whereby said pin displaces the stop member from the neutral position to the first position thereof to thereby stop the normal rotation of the driving shaft when the film is loosely fed by said maximum amount into the take-up chamber.

5. A cinecamera as defined in claim 4, wherein said first counter gear further includes a prolonged hole, and said second operating means comprises a second counter gear rotatably mounted on said integral shaft; said second counter gear being associated with the driving shaft when said film transporting means is operated to loosely feed the film into the take-up chamber and loosely rewind the loosely fed film into the supply chamber, and a pin provided on the second counter gear; said second counter gear being positioned for the pin thereon to engage said stop member on the opposite side of said pin of the first counter gear through said prolonged hole, whereby said pin of the second counter gear displaces the stop member from the neutral position to the second position thereof to thereby stop the reverse rotation of the driving shaft when the film is loosely rewound into the supply chamber by the same amount as that of the film loosely fed into the take-up chamber.

6. A cinecamera as defined in claim 1, wherein said determining means comprises
  a cam member movable in association with the driving shaft; and
  a cam follower biassed to contact with the cam member and movable between a first position and a second position:
  said cam member displacing the cam follower from the first position to the second position thereof while the film is wound on the take-up shaft from the first extremity to the middle thereof and from the second position to the first position while the film is wound from the middle to the last extremity thereof.

* * * * *

UNITED STATES PATENT OFFICE
CERTIFICATE OF CORRECTION

Patent No. 3,689,137                         Dated September 5, 1972

Inventor(s) YOZO IIDA

It is certified that error appears in the above-identified patent and that said Letters Patent are hereby corrected as shown below:

On the title page, line 2, change "Yozo" to read --Iida--;

at entry 72, change "Iida Yozo" to read --Yozo Iida--;

Column 1, line 24, "temporally" should read --temporarily--.

Column 2, line 2, delete "including" and insert --includes a--;

line 6, delete "and" and insert --is--;

line 7, before "the", insert --and--;

line 8, change "displace" to --displacing--;

line 10, before "manner", insert --a--;

line 14, change "displace" to --displacing--;

line 15, change "displace" to --displacing--;

line 20, change "the amount of the film" to read --the amount of film--;

line 47, change "form" to --from--;

Column 3, line 9, "shutter 6" should read --sector 6--;

line 17, "direction" should read -- directions---.

UNITED STATES PATENT OFFICE
CERTIFICATE OF CORRECTION

Patent No. 3,689,137                    Dated September 5, 1972

Inventor(s)   YOZO IIDA                           Page 2 of 3

It is certified that error appears in the above-identified patent and that said Letters Patent are hereby corrected as shown below:

Column 3, line 41, delete "integrally" and insert --a--;

line 41, delete "which" and insert --integral therewith as--;

line 42 & 43, change "marking" to --markings--;

line 44, change "marking" to --markings--;

change "cooperates" to --cooperate--;

line 51, delete "to";

line 52, delete "be described";

line 67, delete "side".

Column 4, line 1, after "described", insert --below,--.

lines 11 and 12, the phrase "connecting operative" should read --connected operatively--;

line 24, change "displace" to --displacing--;

line 40 & 41, "and formed" should read --are formed--;

Column 5, line 21, after "micromotor" delete ",";

line 32, change "unshown" to read --an--;

line 33, after "member", insert --(not shown)--;

UNITED STATES PATENT OFFICE
CERTIFICATE OF CORRECTION

Patent No. 3,689,137　　　　　　　Dated September 5, 1972

Inventor(s) YOZO IIDA

It is certified that error appears in the above-identified patent and that said Letters Patent are hereby corrected as shown below:

Column 7, line 60, after "chamber", insert --in--;

Column 8, line 49, "bear" should read --gear--;

Column 10, line 8, change ":" to --;--.

Signed and sealed this 23rd day of July 1974.

(SEAL)
Attest:

McCOY M. GIBSON, JR.　　　　　　　C. MARSHALL DANN
Attesting Officer　　　　　　　　　Commissioner of Patents